(12) United States Patent
Tanno

(10) Patent No.: US 11,094,046 B2
(45) Date of Patent: Aug. 17, 2021

(54) RADIOGRAPHIC IMAGING APPARATUS

(71) Applicant: Shimadzu Corporation, Kyoto (JP)

(72) Inventor: Keiichi Tanno, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 56 days.

(21) Appl. No.: 16/441,091

(22) Filed: Jun. 14, 2019

(65) Prior Publication Data

US 2020/0043153 A1 Feb. 6, 2020

(30) Foreign Application Priority Data

Aug. 2, 2018 (JP) .............................. JP2018-146185

(51) Int. Cl.
*G06T 5/50* (2006.01)

(52) U.S. Cl.
CPC ...... *G06T 5/50* (2013.01); *G06T 2207/10121* (2013.01); *G06T 2207/30048* (2013.01); *G06T 2207/30204* (2013.01)

(58) Field of Classification Search
CPC ........... G06T 5/002; G06T 5/50; G06T 5/003; G06T 7/11; G06T 7/0012; G06T 7/33; G06T 7/246; G06T 2207/10116; G06T 2207/10121; G06T 2207/20104; G06T 2207/20164; G06T 2207/20182; G06T 2207/20192; G06T 2207/20221; G06T 2207/30021; G06T 2207/30048; G06T 2207/30052; G06T 2207/30101; G06T 2207/30204; A61B 6/503; A61B 6/032; A61B 6/4441; A61B 5/5217; A61B 5/0402; A61B 6/12; A61B 6/461; A61B 6/486; A61B 6/5205; A61B 6/5211; A61B 6/504; A61B 6/481; A61B 90/36; A61B 2017/22001; A61B 2090/376
See application file for complete search history.

(56) References Cited

U.S. PATENT DOCUMENTS

| | | |
|---|---|---|
| 7,415,169 B2 | 8/2008 | Florent et al. |
| 8,594,271 B2 | 11/2013 | Sakaguchi et al. |
| 9,532,754 B2 | 1/2017 | Sakaguchi et al. |
| 10,028,711 B2 | 7/2018 | Sakaguchi et al. |
| 2005/0058363 A1* | 3/2005 | Florent .................. G06T 5/002 382/261 |
| 2014/0051991 A1* | 2/2014 | Sakaguchi ............... G06T 7/11 600/424 |
| 2016/0350896 A1* | 12/2016 | Matsubara ............... G06T 5/50 |
| 2017/0209109 A1* | 7/2017 | Tsutsui .................. A61B 6/461 |
| 2017/0316579 A1* | 11/2017 | Watanabe ................ G06T 7/73 |
| 2018/0279986 A1* | 10/2018 | Nagae ..................... A61B 6/06 |
| 2018/0317865 A1 | 11/2018 | Sakaguchi et al. |
| 2019/0213741 A1* | 7/2019 | Nagae ..................... G06T 7/33 |

FOREIGN PATENT DOCUMENTS

| | | |
|---|---|---|
| JP | 2005-510288 A | 4/2005 |
| JP | 2010-131371 A | 6/2010 |

* cited by examiner

*Primary Examiner* — Kim Y Vu
*Assistant Examiner* — Francisco A Agra
(74) *Attorney, Agent, or Firm* — Muir Patent Law, PLLC

(57) ABSTRACT

A radiographic imaging apparatus includes an image generation unit that generates radiation images, and an image processing unit that synthesizes a plurality of radiation images to generate an enhanced image. The image processing unit is configured to synthesize the plurality of radiation images by weighting each of the plurality of radiation images in accordance with a feature point distance.

7 Claims, 4 Drawing Sheets

RADIOGRAPHIC IMAGING APPARATUS

CROSS-REFERENCE TO RELATED APPLICATIONS

Related application number JP 2018-146185, entitled "Radiographic Imaging Apparatus," filed on Aug. 2, 2018 and invented by Keiichi Tanno, upon which this patent application is based, is hereby incorporated by reference.

BACKGROUND OF THE INVENTION

Field of the Invention

The present invention relates to a radiographic imaging apparatus, and more particularly to a radiographic imaging apparatus that synthesizes a plurality of radiation images to generate an enhanced image in which an enhancement target object in the radiation images is enhanced.

Description of the Background Art

Conventionally, an apparatus is known, in which a plurality of radiation images is synthesized to generate an enhanced image in which an enhancement target object in the radiation images is enhanced, i.e., emphasized. Such an apparatus is disclosed, for example, in Japanese Translation of PCT International Application Publication No. 2005-510288.

The Japanese Translation of PCT International Application Publication No. 2005-510288 discloses a medical viewing system used for an intravascular interventional treatment. The intravascular interventional treatment denotes a treatment to treat a stenosis portion that has occurred in a blood vessel due to a thrombus or the like. Specifically, in an intravascular interventional treatment, a balloon to which a stent is attached is inserted to a stenosis portion in a blood vessel, and then the balloon is inflated. In a state in which the stenosis portion and the stent are expanded by the inflated balloon, the stent is indwelled in the stenosis portion. As a result, the indwelled stent can support the stenosis portion in the expanded state, so the restenosis rate of the stenosis portion can be reduced.

In addition, in an intravascular interventional treatment, imaging of a stenosis portion using X-rays (radiation) is performed. A doctor performs a task of placing a balloon to which a stent is attached to the stenosis portion while confirming the imaged stenosis portion using X-rays. At this time, the medical viewing apparatus described in the aforementioned Japanese Translation of PCT International Application Publication No. 2005-510288 is configured to generate a sequence image obtained by temporally integrating (synthesizing) X-ray images (radiation images) acquired using X-rays and display the sequence image on a display means. In the sequence image, the stent is highlighted by temporally integrating X-ray images, so it is possible to facilitate the task of placing the stent and the balloon in the stenosis portion.

Note that the stent is disposed in the blood vessel and therefore it moves along with heartbeats and changes in shape. For this reason, when X-ray images are simply temporally integrated, X-ray images different in shape of the stent are temporally integrated, which results in a blurred sequence image of the stent. For this reason, the medical viewing apparatus described in the aforementioned Japanese Translation of PCT International Application Publication No. 2005-510288 is configured to acquire the similarity information of X-ray images and weight the X-ray images based on the acquired similarity information.

However, in the medical viewing apparatus described in the aforementioned Japanese Translation of PCT International Application Publication No. 2005-510288, the X-ray images are weighted based on the similarity information thereof, which increases the processing load for weighting. For this reason, it is difficult to reduce the processing load for weighting. Therefore, when the shape of the stent (enhancement target object) in the subject changes in accordance with heartbeats, there is a problem that it is difficult to generate the sequence image (enhanced image) in which the stent is clearly enhanced while reducing the processing load for weighting.

SUMMARY OF THE INVENTION

The present invention has been made to solve the aforementioned problems. It is an object of the present invention to provide a radiographic imaging apparatus capable of generating an enhanced image in which an enhancement target object is clearly enhanced while reducing the processing load for weighting even in cases where the shape of the enhancement target object in the subject changes in accordance with heartbeats.

In order to attain the aforementioned object, a radiographic imaging apparatus according to one aspect of the present invention includes:

an image generation unit configured to generate a radiation image based on radiation transmitted through a subject; and an image processing unit configured to synthesize a plurality of radiation images continuous in time series generated by the image generation unit and generate an enhanced image in which an enhancement target object in the radiation image is enhanced in real time, wherein the image processing unit is configured to weight each of the plurality of radiation images in accordance with a feature point distance between a position of a feature point of a reference image among the plurality of radiation images and a position of the feature point of an image other than the reference image among the plurality of radiation images and synthesize the plurality of radiation images.

Note that, in this specification, "real time" is a broad concept which means that generation of a radiation image by the image generation unit and generation of the enhanced image by the image processing unit are performed in parallel.

Note that there is a correlation between the feature point distance, the heart beat phase, and the shape of the enhancement target object. Specifically, there is a following correlation. When the feature point distance becomes smaller, the phase of heart beats becomes aligned, so the shape of the enhancement target object in the reference image and the shape of the radiation image other than the reference image become similar. When the feature point distance becomes larger, the phase of heart beats becomes unaligned, so the shape of the enhancement target object in the reference image and the shape of the radiation image other than the reference image do not become similar.

Therefore, utilizing the fact that there is such correlation, in the radiographic imaging apparatus according to one aspect of the present invention, as mentioned above, by weighting each of the plurality of radiation images in accordance with the feature point distance, the plurality of radiation images can be synthesized by increasing the weighting of the radiation image in which the shape of the enhancement target object is uniform to some degree and decreasing the weighting of the radiation image in which the shape of the enhancement target object is not uniform to some degree. As a result, since weighting can be performed with high accuracy, it is possible to generate an enhanced image M in which the enhancement target object is clearly enhanced.

Further, since it is only necessary to obtain the feature point distance for the purpose of acquiring weighting to be given to radiation images, the processing load for weighting can be reduced as compared with the case of weighting in accordance with similarity information between X-ray images. As a result, even in cases where the shape of the enhancement target object in the subject changes with heartbeats, it is possible to provide a radiographic imaging apparatus capable of generating an enhanced image in which the enhancement target object is enhanced while reducing the processing load for weighting.

Like in the radiographic imaging apparatus according to one aspect of the present invention, in the case of generating an enhanced image M in real time, it is very effective that an enhanced image M in which the enhancement target object is clearly enhanced can be generated while reducing the processing load for weighting.

In the radiographic imaging apparatus according to the aforementioned one aspect of the present invention, it is preferable that the feature point includes a first feature point and a second feature point and that the image processing unit is configured to weight the plurality of radiation images using the feature point distance between the first feature points of the reference image and the image other than the reference image and the feature point distance between the second feature points of the reference image and the image other than the reference image.

By configuring as described above, the radiation image can be weighted using both the feature point distance between the first feature points and the feature point distance between the second feature points. Therefore, weighting can be performed more accurately as compared with the case in which the radiation images are weighted using only one of the feature point distance between the first feature points and the feature point distance between the second feature points.

In this case, it is preferable that the first feature point and the second feature point are a first marker and a second marker, respectively, and the image processing unit is configured to obtain the feature point distance between distal markers in the reference image and the image other than the reference image and the feature point distance between proximal markers in the reference image and the image other than the reference image based on the distal markers distant from the reference position between the first marker and the second marker and the proximal markers proximal to the reference position of the first marker and the second marker.

By configuring as described above, the feature point distance between the distal markers and the feature point between the proximal markers can be obtained separately in a state in which the distal marker and the proximal marker are clearly distinguished. For this reason, it is possible to obtain the feature point distance of each feature point can be obtained more accurately.

In the radiographic imaging apparatus according to the aforementioned one aspect, it is preferable that the image processing unit is configured to weight the radiation images so that a reduction degree of weighting decreases as the feature point distance increases.

By configuring as described above, compared with the case of weighting radiation images so that weighting monotonously decreases as the feature point distance increases, it is possible to further reduce the weighting to be given the radiation image having a larger feature point distance while increasing the weighting to be given to the radiation image having a smaller feature point distance. As a result, since weighting can be performed with higher accuracy, it is possible to generate an enhanced image M in which the enhancement target object is more clearly enhanced.

In this case, it is preferable that the image processing unit is configured to weight the radiation images so that the weighting decreases exponentially as the feature point distance increases.

By configuring as described above, compared with the case of weighting radiation images so that weighting monotonously decreases as the feature point distance increases, it is possible to more assuredly reduce the weighting to be given the radiation image having a larger feature point distance while more assuredly increasing the weighting to be given to the radiation image having a smaller feature point distance.

In the configuration of weighting the radiation images so that the degree of decrease in weighting decreases as the feature point distance increases, it is preferable that the image processing unit is configured to weight the radiation images within a range of more than 0 and 1 or less. By configuring as described above, it can be suppressed that an excessively large weighting is given to the radiation images, so that it is possible to suppress occurrence of imbalance of the pixel value when the plurality of radiation images are weighted and synthesized.

In the radiographic imaging apparatus according to the aforementioned one aspect, it is preferable that the image generation unit is configured to generate the radiation images based on the radiation transmitted through the subject in a state in which the enhancement target object is positioned at a position where a shape of the enhancement target object changes with heartbeats.

By configuring as described above, it is possible to easily generate a radiation image in which the enhancement target object is reflected. Therefore, it is possible to easily generate an enhanced image in which the enhancement target object is enhanced. In this specification, the state in which the enhancement target object is positioned at the position where a shape of the enhancement target object changes with heartbeats denotes, for example, a state in which the enhancement target object is positioned in a coronary artery of a heart.

DESCRIPTION OF PREFERRED EMBODIMENTS

Hereinafter, embodiments of the present invention will be described with reference to the attached drawings.

Configuration of X-Ray Imaging Apparatus

The configuration of an X-ray imaging apparatus 100 according to an embodiment of the present invention will be described with reference to FIG. 1 to FIG. 5. Note that the X-ray imaging apparatus 100 is one example of the "radiographic imaging apparatus" recited in claims.

Figure 1:
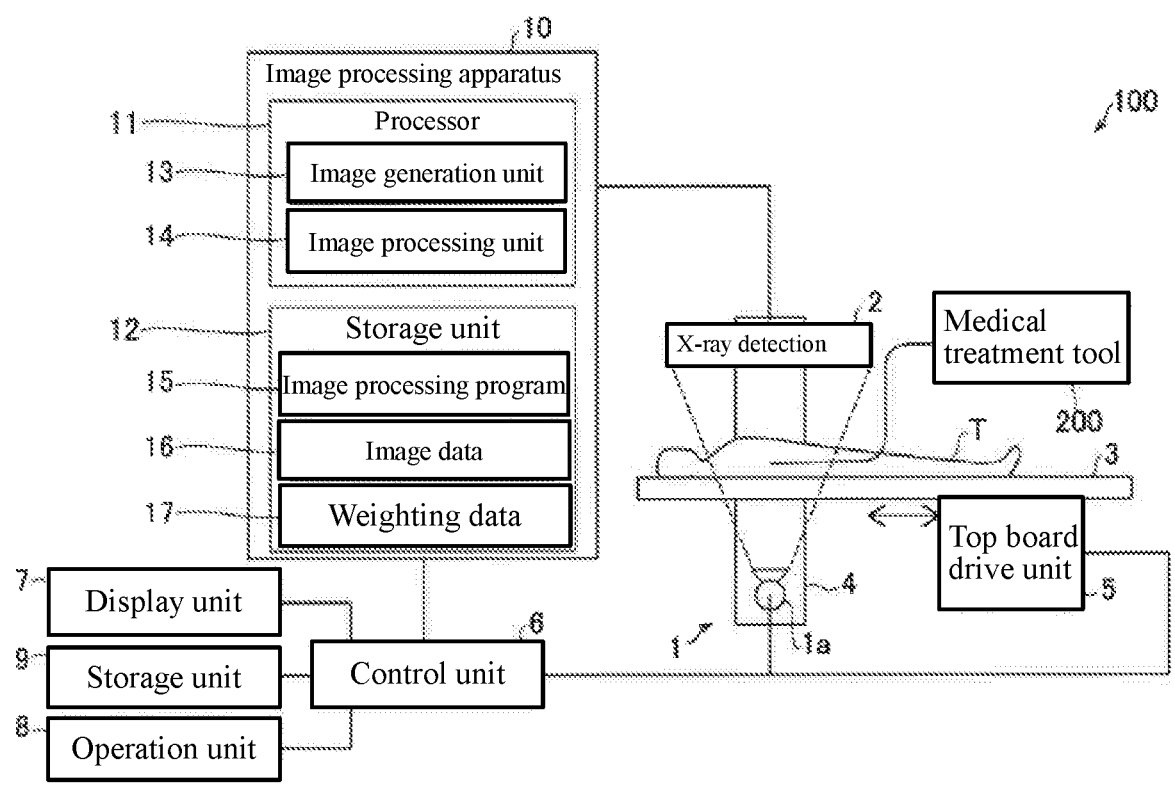
FIG. 1 is a block diagram showing an overall configuration of a radiographic imaging apparatus according to an embodiment of the present invention.

The X-ray imaging apparatus 100 according to the embodiment of the present invention is an apparatus for imaging an inside of a subject T by emitting X-rays (radiation) from the outside of the subject T such as a human body as shown in FIG. 1. The X-ray imaging apparatus 100 is used for an intravascular interventional treatment for, e.g., coronary arteries. The intravascular interventional treatment is a treatment for a stenosis portion that has occurred in a blood vessel B due to thrombosis or the like.

Figure 2A:
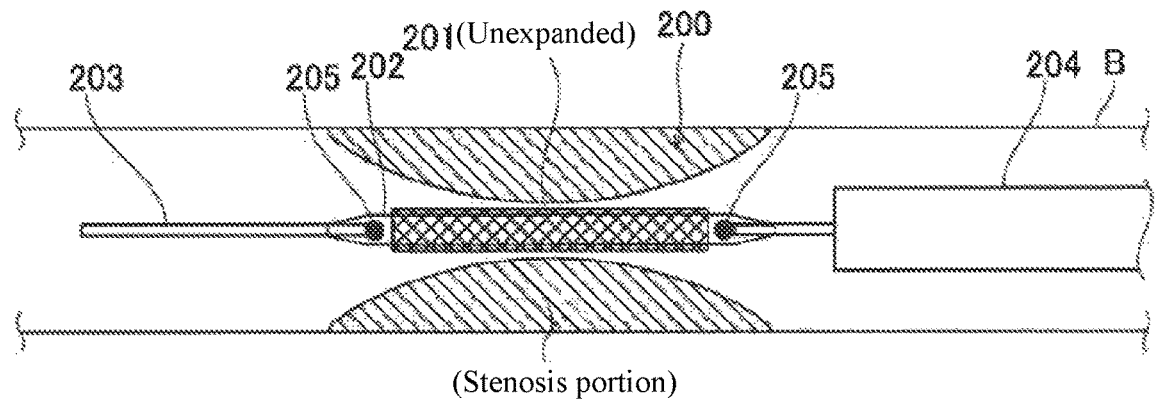
FIG. 2A is a view for explaining a medical treatment tool including a stent, and is a view showing the medical treatment tool including the stent in an unexpanded state.
Figure 2B:
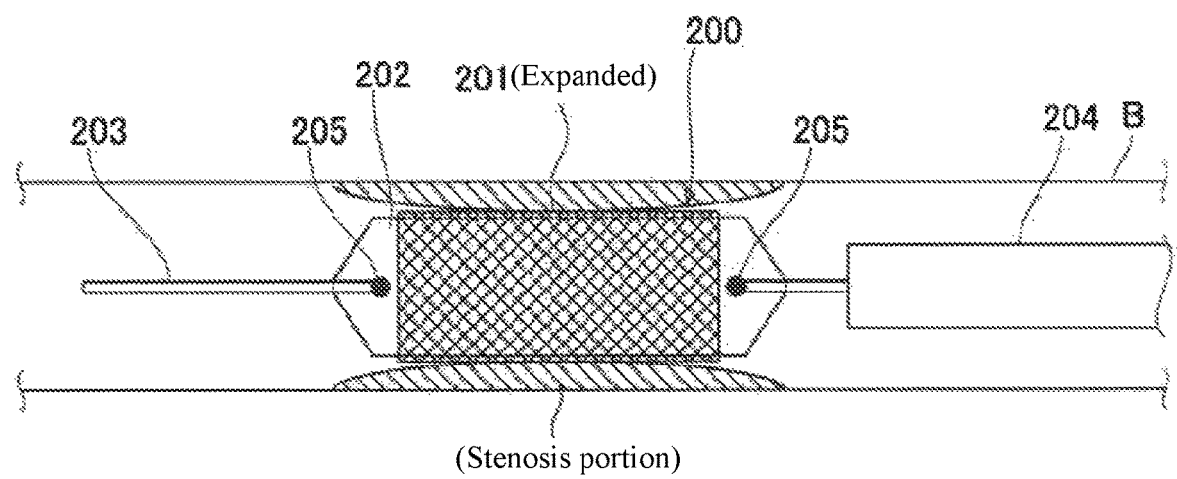
FIG. 2B is a view for explaining a medical treatment tool including a stent, and is a view showing the medical treatment tool including the stent in an expanded state.

In the intravascular interventional treatment, as shown in FIG. 2, a medical treatment tool 200 is used. The medical treatment tool 200 is composed of a stent 201, a balloon 202 to which the stent 201 is attached, a guide wire 203 to which the stent 201 and the balloon 202 are attached near the tip, and a catheter 204 in which the guide wire 203 is accommodated.

The stent 201 has a mesh structure formed of, e.g., thin metals and is formed in a tubular shape, and readily transmits X-rays. Thus, the stent hardly appears in an X-ray image P (see FIG. 3). For this reason, the balloon 202 to which the stent 201 is attached is provided with a pair of markers 205 made of a material low in radiolucency (or radiopaque material) as marks.

The pair of markers 205 is provided near at both ends of the stent 201 so as to sandwich the stent 201. It is configured such that the stent 201 is expanded as the balloon 202 expands.

It should be noted that the stent 201 is an example of the "enhancement target object" recited in claims. Also note that the marker 205 is an example of the "feature point" recited in claims. Further note that the X-ray image P is an example of the "radiation image" recited in claims.

In an intravascular interventional treatment, first, a doctor inserts the catheter 204 into the blood vessel B of the subject T, and makes the stent 201 and the balloon 202 reach the stenosis portion of the blood vessel B. Then, the doctor positions the stent 201 and the balloon 202 to the stenosis portion while referring to the enhanced image M (see FIG. 3), which will be described later, generated by the X-ray imaging apparatus 100. Then, the doctor expands the stenosis portion of the blood vessel B and the stent 201 therein by inflating the balloon 202.

As a result, the stenosis portion of the blood vessel B is supported from the inside by the stent 201. In addition, the doctor confirms whether the stent 201 has been correctly indwelled while referring to the enhanced image M. Then, when the stent 201 has been correctly indwelled, the doctor pulls out the catheter 204 from the blood vessel B to complete the treatment. On the other hand, when the stent 201 has not been properly indwelled, the doctor adjusts the expansion state of the stent 201 by, for example, inflating the balloon 202 again.

Next, the configuration of the X-ray imaging apparatus 100 will be described with reference to FIG. 1. As shown in FIG. 1, the X-ray imaging apparatus 100 is provided with an X-ray irradiation unit 1, an X-ray detection unit 2, a top board 3, a moving mechanism 4, a top board drive unit 5, a control unit 6, and a display unit 7, an operation unit 8, a storage unit 9, and an image processing apparatus 10.

The X-ray irradiation unit 1 irradiates X-rays to the subject T into which the stent 201 (see FIG. 2) of the medical treatment tool 200 has been introduced. The X-ray detection unit 2 detects the X-rays transmitted through the subject T. The X-ray irradiation unit 1 and the X-ray detection unit 2 are arranged so as to face each other with the subject T arranged there between. The X-ray irradiation unit 1 and the X-ray detection unit 2 are movably supported by the moving mechanism 4. The top board 3 is movable in a horizontal direction by the top board drive unit 5. The moving mechanism 4 and the top board drive unit 5 are connected to the control unit 6. The control unit 6 controls the movements of the X-ray irradiation unit 1, the X-ray detection unit 2, and the top board 3 via the moving mechanism 4 and the top board drive unit 5 so that the region of the subject T including the stenosis portion of the blood vessel B can be imaged.

The X-ray irradiation unit 1 is equipped with an X-ray source 1a. The X-ray source 1a is an X-ray tube connected to a high voltage generation unit (not shown) and configured to generate X-rays when a high voltage is applied. The X-ray source 1a is arranged with the X-ray emission direction directed to the detection surface of the X-ray detection unit 2. The X-ray irradiation unit 1 is connected to the control unit 6. The control unit 6 controls the X-ray irradiation unit 1 in accordance with the preset imaging conditions, such as, e.g., the tube voltage, the tube current, and the time intervals of the X-ray irradiation, and generates X-rays from the X-ray source 1a.

The X-ray detection unit 2 detects the X-rays irradiated from the X-ray irradiation unit 1 and transmitted through the subject T, and outputs a detection signal according to the detected X-ray intensity. The X-ray detection unit 2 is configured by, for example, an FPD (Flat Panel Detector). The X-ray detection unit 2 outputs an X-ray detection signal of predetermined resolution to the image processing apparatus 10. The image processing apparatus 10 obtains the X-ray detection signal from the X-ray detection unit 2 and generates an X-ray image P (see FIG. 3).

The control unit 6 is a computer configured so as to include a CPU (Central Processing Unit), a ROM (Read Only Memory), a RAM (Random Access Memory), and the like. The control unit 6 functions as a control unit that controls each part of the X-ray imaging apparatus 100 by executing a predetermined control program by the CPU. The control unit 6 performs control of the X-ray irradiation unit 1 and the image processing apparatus 10, drive control of the moving mechanism 4 and the top board drive unit 5, and the like.

The display unit 7 is, for example, a monitor such as a liquid crystal display, and can display an X-ray image P, an enhanced image M and the like generated by the image processing apparatus 10. The control unit 6 is configured to perform control to make the display unit 7 display the X-ray image P, the enhanced image M, and the like generated by the image processing apparatus 10.

The operation unit 8 is configured to be able to receive a user's input regarding X-ray imaging. The control unit 6 is configured to receive an input operation by the user via the operation unit 8.

The storage unit 9 is configured by a storage device, such as, e.g., a hard disk drive. The storage unit 9 is configured to store image data, imaging conditions, and various setting values. Each of the display unit 7, the operation unit 8 and the storage unit 9 may be provided in the image processing apparatus 10.

The X-ray imaging apparatus 100 is configured so that an X-ray image P can be obtained in two ways, X-ray fluoroscopy and X-ray imaging. In the X-ray fluoroscopy, by irradiating an X-ray dose lower than in the X-ray imaging to the subject T, the exposure dose of the subject T can be reduced, but a low-quality X-ray image P is acquired. On the other hand, in the X-ray imaging, an X-ray image P having a certain degree of high image quality is acquired.

In the image processing apparatus 10, image processing is performed in real time during imaging of the subject T. The image processing apparatus 10 is a computer composed of, for example, a processor 11 such as a CPU or a GPU (Graphics Processing Unit), and a storage unit 12 such as a ROM and a RAM. That is, the image processing apparatus 10 is configured by making the processor 11 execute the image processing program 15 stored in the storage unit 12. The image processing apparatus 10 may be configured integrally with the control unit 6 by making the same hardware (CPU) as the control unit 6 executes an image processing program.

The storage unit 12 stores the image processing program 15 for making the computer function as the image processing apparatus 10. The storage unit 12 is configured to temporarily store, as the image data 16, X-ray images P generated by an image generation unit 13 that will be described later, an enhanced image M generated by an image processing unit 14 that will be described later, and the like.

The image processing apparatus 10 includes an image generation unit 13 and an image processing unit 14 as functions that will be attained by executing the image processing program 15. The image generation unit 13 and the image processing unit 14 may be individually configured by respective dedicated processors.

The image generation unit 13 is configured to generate an X-ray image P based on a detection signal of the X-ray transmitted through the subject T into which the stent 201 (see FIG. 2) of the medical treatment tool 200 has been introduced. That is, the image generation unit 13 is configured to generate an X-ray image P based on the X-ray transmitted through the subject T in a state in which the stent 201 is positioned at a position where a shape of the stent T changes with heartbeats during the intravascular interventional treatment.

The image generation unit 13 generates the X-ray image P in the form of a moving image based on the detection signal from the X-ray detection unit 2. That is, X-rays are intermittently emitted from the X-ray irradiation unit 1 to the subject T at predetermined time intervals, and the X-ray detection unit 2 sequentially detects the X-rays transmitted through the subject T. The image generation unit 13 generates X-ray images P at a predetermined frame rate (for example, 30 FPS) by imaging the detection signals sequentially output from the X-ray detection unit 2.

The X-ray image P is, for example, an image having a pixel value of a predetermined gradation number (such as 10 to 12 bits) in grayscale. For this reason, a pixel having a low pixel value is small in luminance value and is displayed blackly (darkly), while a pixel having a high pixel value is large in luminance value and is displayed largely whitely (brightly). Note that the image may be reversed in black and white.

Figure 3:
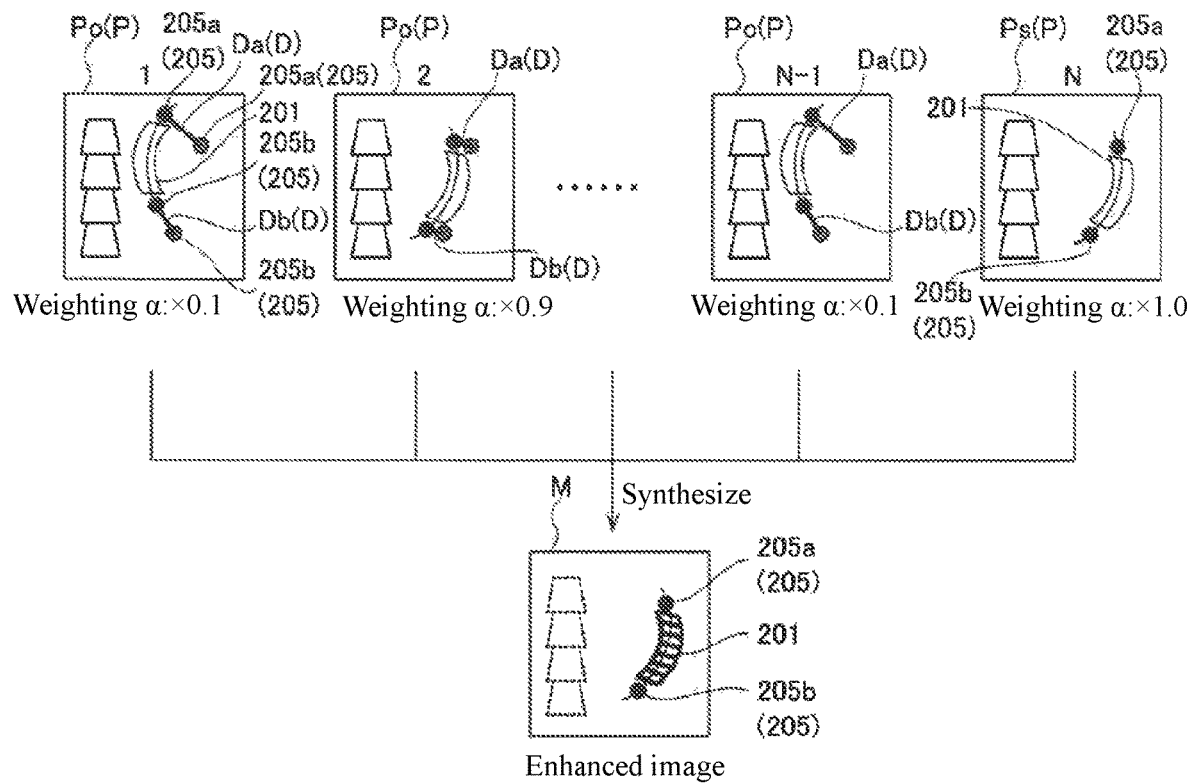
FIG. 3 is a diagram for explaining generation of an enhanced image based on a plurality of radiation images in the radiographic imaging apparatus according to an embodiment of the present invention.
Figure 4:
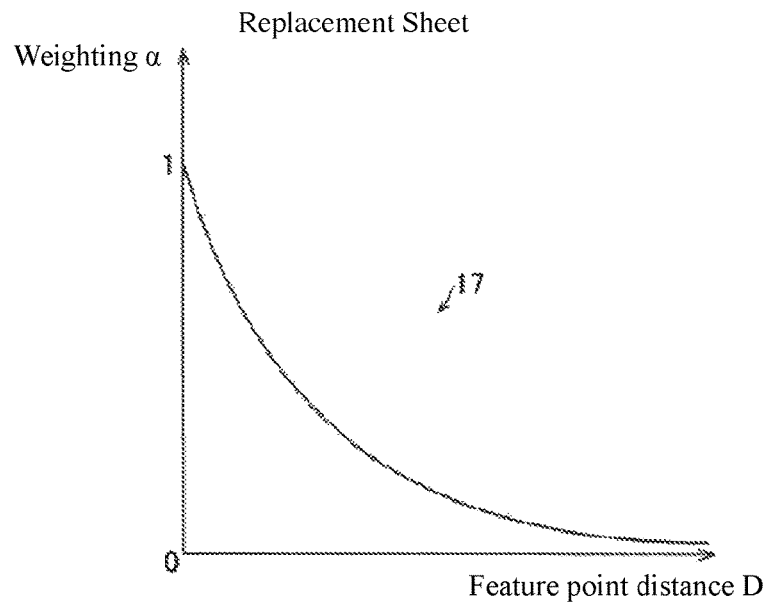
FIG. 4 is a graph showing the relationship between weighting and a feature point distance in the radiographic imaging apparatus according to the embodiment of the present invention.

As shown in FIG. 3, the image processing unit 14 is configured to generate an enhanced image M in which the stent 201 in the X-ray image P is enhanced by synthesizing (integrating) a plurality (N pieces (N frames)) of X-ray images P continuous in time series generated by the image generation unit 13. The number N of X-ray images P to be synthesized is smaller than a frame rate (for example, 30 FPS). For example, the number of X-ray images is 8 (eight). This makes it possible to easily generate an enhanced image M in real time by reducing the processing load for synthesizing the X-ray images P.

In the process of generating the enhanced image M, first, the image processing unit 14 performs a position adjustment of images Po other than the reference image Ps among X-ray images P to be synthesized with respect to the reference image Ps which is the latest image among the X-ray images P to be synthesized by image processing such as affine transformation. At this time, the image processing unit 14 aligns the images Po other than the reference image Ps with respect to the reference image Ps so that the positions of the pair of markers 205 of the images Po other than the reference image Ps coincide with the positions of the pair of markers 205 of the reference image Ps.

Then, the image processing unit 14 synthesizes X-ray images P as the images Po after position adjustment and the X-ray image P as the reference image Ps to generate an enhanced image M in which the stent 201 in the X-ray image P is enhanced. With this, X-ray images P can be synthesized each other in a state in which the position of the stent 201 is aligned in the images. Therefore, it is possible to easily obtain an enhanced image M with the stent 201 clearly enhanced. Note that in the case of performing the position adjustment, since the position of the background image is displaced, a blurred enhanced image M is obtained for the background image.

Here, in this embodiment, at the time of synthesizing N pieces of X-ray images P, the image processing unit 14 is configured to synthesize the plurality of X-ray images P by weighting each of the plurality of X-ray images P depending on the feature point distance D between the position of the marker 205 of the reference image Ps and the position of the marker 205 of the image Po (the image Po before position adjustment) other than the reference image Ps.

Specifically, first, in each of the X-ray images P to be synthesized, the image processing unit 14 detects the distal marker 205a distal from the reference position (e.g., the position of the heart) between the pair of markers 205 and the proximal marker 205b proximal to the reference position between the pair of markers 205.

Then, based on the detected distal marker 205b and the detected proximal marker 205b, the image processing unit 14 obtains the feature point distance Da of the distal markers 205a in the reference image Ps and the image Po other than the reference image Ps and the feature point distance Db of the proximal markers 205b in the reference image Ps and the image Po other than the reference image Ps.

Then, the image processing unit 14 weights the X-ray images P using the feature point distance Da and the feature point distance Db. For example, the image processing unit 14 obtains the mean value and the integrated value of the feature point distance Da and the feature point distance Db as feature point distances D used for weighting, and weights the X-ray images P.

The image processing unit 14 obtains weighting α (weighting factor) according to the feature point distance D based on the weighting data 17 (see FIG. 1) stored in advance in the storage unit 12. The weighting data 17 is information in which the feature point distance D is associated with the weighting α. The weighting data 17 is set such that the weighting α increases as the feature point distance D decreases, and the weighting α decreases as the feature point distance D increases.

Specifically, the weighting data 17 is information on an exponential function in which the weighting α decreases as the feature point distance D increases. The image processing unit 14 weights the X-ray images P based on the weighting data 17 so that the reduction degree of the weighting α decreases as the feature point distance D increases.

More specifically, the image processing unit 14 weights the X-ray images P so that the weighting α decreases exponentially as the feature point distance D increases. Furthermore, the weighting data 17 is set such that the weighting α is 1 when the feature point distance D is 0 and that the weighting α approaches 0 as the feature point distance D increases. For this reason, the image processing unit 14 weights the X-ray images P within the range of more than 0 and 1 or less.

Figure 5:
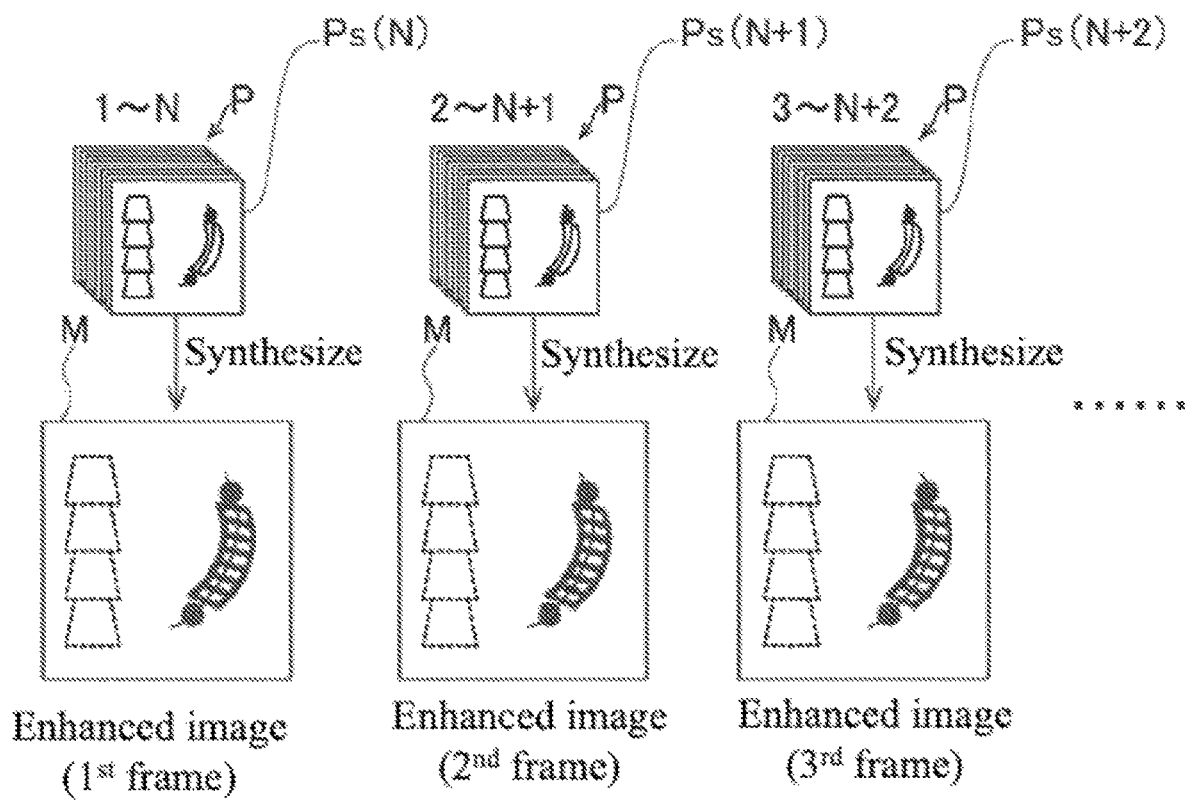
FIG. 5 is a diagram for explaining the sequential generation of an enhanced image in the radiographic imaging apparatus according to the embodiment of the present invention.

As shown in FIG. 5, after the $N^{th}$ X-ray image P is generated, the image processing unit 14 sequentially generates a new enhanced image M each time a new X-ray image P is generated. With this, the image processing unit 14 generates the enhanced image M in the form of a moving image.

Specifically, as a new X-ray image P is generated, the image processing unit 14 synthesizes new N pieces of X-ray images (latest N pieces of X-ray images P) consecutive in time series including a new X-ray image P (latest X-ray image P) to generate a new enhanced image M. For example, when a $(N+1)^{th}$ X-ray image P is generated, the image processing unit 14 synthesizes the $2^{nd}$ X-ray image P to the $(N+1)^{th}$ X-ray image P consecutive in a time series including the $(N+1)^{th}$ X-ray image P to generate a new $2^{nd}$ frame enhanced image M. In the same manner, when a $(N+2)^{th}$ X-ray image P is generated, the image processing unit 14 synthesizes the $3^{rd}$ X-ray image P to the $(N+2)^{th}$ X-ray image P consecutive in a time series including the $(N+2)^{th}$ X-ray image P to generate a new $3^{rd}$ frame enhanced image M.

Also, when generating a new enhanced image M, the image processing unit 14 regards the new X-ray image P as a new reference image Ps and acquires a new feature point distance D based on the new reference image Ps. Then, the image processing unit 14 synthesizes the latest N pieces of X-ray images P by weighting each of the latest N pieces of X-ray images P in accordance with the new feature point distance D. Thus, an enhanced image M in which the latest position of the stent 201 is clearly enhanced is continuously generated.

Effects of This Embodiment

In this embodiment, the following effects can be obtained.
In this embodiment, as described above, each of a plurality of X-ray images P is weighted in accordance with the feature point distance D. Thus, it is possible to synthesize a plurality of X-ray images P in a state in which X-ray images P uniform in shape of the stent 201 are weighted to a large extent and X-ray images P not uniform in shape of the stent 201 are weighted to a small extent. As a result, since weighting can be performed with high accuracy, it is possible to generate an enhanced image M in which the stent 201 is clearly enhanced.

Further, since it is only necessary to acquire the feature point distance D in order to acquire weighting to be given to X-ray images P, the processing load for weighting can be reduced as compared with the case of weighting in accordance with similarity information between X-ray images P.

As a result, even if the shape of the stent 201 in the subject T changes with heartbeats, it is possible to provide an X-ray imaging apparatus 100 capable of generating an enhanced image M in which the stent 201 is clearly enhanced while reducing the processing load for weighting.

Like in the X-ray imaging apparatus 100 according to this embodiment, in the case of generating an enhanced image M in real time, it is very effective that an enhanced image M in which the stent 201 is clearly enhanced can be generated while reducing the processing load for weighting.

In this embodiment, as described above, the image processing unit 14 is configured to weight the X-ray images P using the feature point distance Da between the markers 205a and the feature point distance Db between the markers 205b. In this way, the X-ray images P can be weighted using both the feature point distance Da between the markers 205a and the feature point distance Db between the markers 205b. Therefore, weighting can be performed with higher accuracy than in the case of weighting X-ray images P using only one of the feature point distance Da of the markers 205a and the feature point distance Db of the markers 205b.

Further, in this embodiment, the image processing unit 14 is configured to obtain the feature point distance Da between the distal markers 205a in the reference image Ps and the image other than the reference image Ps and the feature point distance Db between proximal marker 205b in the reference image Ps and the image other than the reference image Ps based on the distal markers 205a distant from the reference position between the pair of markers 205 and the proximal markers 205b proximal to the reference position of the pair of markers 205. As a result, the feature point distance D between the distal markers 205a and the feature point distance D between the proximal markers 205b can be obtained separately in a state in which the distal marker 205a and the proximal marker 205b are clearly distinguished. For this reason, it is possible to obtain the feature point distance D of each marker 205 can be obtained more accurately.

Further, in this embodiment, the image processing unit 14 is configured to weight the X-ray images P so that the reduction degree of weighting decreases as the feature point distance D increases. With this, compared with the case of weighting X-ray images P so that weighting monotonously decreases as the feature point distance D increases, it is possible to further reduce the weighting to be given the feature point distance D having a larger feature point distance D while increasing the weighting to be given to the X-ray image P having a smaller feature point distance D. As a result, since weighting can be performed with higher accuracy, it is possible to generate an enhanced image M in which the stent 201 is more clearly enhanced.

Further, in this embodiment, the image processing unit 14 is configured to weight the X-ray images P so that the weighting decreases exponentially as the feature point distance D increases. With this, compared with the case of weighting X-ray images P so that weighting monotonously decreases as the feature point distance D increases, it is possible to more assuredly reduce the weighting to be given the feature point distance D having a larger feature point distance D while more assuredly increasing the weighting to be given to the X-ray image P having a smaller feature point distance D.

Further, in this embodiment, the image processing unit 14 is configured to weight the X-ray images P within the range of more than 0 and 1 or less. As a result, it can be suppressed that excessively large weighting is given to the X-ray images P, so that it is possible to suppress occurrence of imbalance of the pixel value when the plurality of X-ray images P are weighted and synthesized.

Further, in this embodiment, the image generation unit 13 is configured to generate an X-ray image P based on the radiation transmitted through the subject in a state in which the stent 201 is positioned at a position where a shape of the stent T changes with heartbeats. This makes it possible to easily generate an X-ray image P in which the image of the stent 201 is captured, so that an enhanced image M in which the stent 201 is enhanced can be easily generated.

Modified Embodiments

It should be understood that the embodiments disclosed here are examples in all respects and are not restrictive. The scope of the present invention is shown by the scope of the claims rather than the description of the embodiments described above, and includes all changes (modifications) within the meaning of equivalent and the scope of claims.

For example, in the above-described embodiment, an example in which the present invention is applied to an X-ray imaging apparatus as a radiographic imaging apparatus is described, but the present invention is not limited thereto. The present invention may be applied to a radiographic imaging apparatus other than an X-ray imaging apparatus.

Moreover, although an example in which a marker is used as a feature point is shown in the above-described embodiment, the present invention is not limited to this. In the present invention, anything other than a marker may be used as the feature point. For example, a portion or a segment of a subject that absorbs X-rays more easily than other portions of the subject may be used as the feature point.

Further, in the above-described embodiment, an example in which weighting is performed using two markers (feature points) is shown, but the present invention is not limited to this. In the present invention, weighting may be performed using one feature point or may be performed using three or more feature points.

Further, in the above-described embodiment, although an example in which weighting is performed using both the feature point distance between the first markers (feature points) and the feature point distance between the second markers (feature points) is described, the present invention is not limited to this. In the present invention, weighting may be performed using only one of the feature point distance between the first feature points and the feature point distance between the second feature points.

In the above-described embodiment, an example is shown in which the X-ray image (radiation image) is weighted such that the weighting decreases exponentially as the feature point distance increases, but the present invention is not limited thereto. In the present invention, the radiation image may be weighted in any way as long as the radiation image is weighted such that the weighting decreases as the feature point distance increases. For example, it may be configured such that the radiation image is weighted so that the weighting decreases linearly as the feature point distance increases.

Alternatively, it also may be configured such that the radiation images are weighted so that the weighting decreases quadratically as the feature point distance increases.

Further, in the above-described embodiment, an example is shown, in which the X-ray images (radiation images) are weighted within the range of more than 0 and 1 or less, but the present invention is not limited to this. For example, 0 (zero) may be given to a radiation image as weighting, or more than 1 may be given to a radiation image as weighting.

Further, in the above-described embodiments, although examples are shown, in which every time a new X-ray image (radiation image) is generated, the latest N pieces of X-ray images (radiation images) are synthesized to generate a new enhanced image, the present invention is not limited to this. In the present invention, every time a new radiation image is generated, all of the radiation images generated by the present time may be synthesized to generate a new enhanced image.

The invention claimed is:

1. A radiographic imaging apparatus comprising:
an image generation unit configured to generate a radiation image based on radiation transmitted through a subject; and
an image processing unit configured to synthesize a plurality of radiation images arranged in time series generated by the image generation unit and generate an enhanced image in which an enhancement target object in the radiation image is enhanced in real time, wherein
the plurality of radiation images includes at least three images, and
the image processing unit is configured to weight each of the plurality of radiation images in accordance with a feature point distance between a position of a feature point of a reference image which is one image among the plurality of radiation images and a position of the feature point of each of images other than the reference image among the plurality of radiation images and synthesize the plurality of radiation images which are weighted by the weight in accordance with the feature point distance.

2. The radiographic imaging apparatus as recited in claim 1,
wherein the feature point includes a first feature point and a second feature point, and
wherein the image processing unit is configured to weight the plurality of radiation images using the feature point distance between the first feature points of the reference image and the image other than the reference image and the feature point distance between the second feature points of the reference image and the image other than the reference image.

3. The radiographic imaging apparatus as recited in claim 2,
wherein the first feature point and the second feature point are a first marker and a second marker, respectively, and
wherein the image processing unit is configured to obtain the feature point distance between distal markers in the reference image and the image other than the reference image and the feature point distance between proximal markers in the reference image and the image other than the reference image based on the distal markers distant from the reference position between the first marker and the second marker and the proximal markers proximal to the reference position of the first marker and the second marker.

4. The radiographic imaging apparatus as recited in claim 1,
wherein the image processing unit is configured to weight the radiation images so that a reduction degree of weighting decreases as the feature point distance increases.

5. The radiographic imaging apparatus as recited in claim 4,
wherein the image processing unit is configured to weight the radiation images so that the weighting decreases exponentially as the feature point distance increases.

6. The radiographic imaging apparatus as recited in claim 4,
wherein the image processing unit is configured to weight the radiation images within a range of more than 0 and 1 or less.

7. The radiographic imaging apparatus as recited in claim 1,
wherein the image generation unit is configured to generate the radiation images based on the radiation transmitted through the subject in a state in which the enhancement target object is positioned at a position where a shape of the enhancement target object changes with heartbeats.

* * * * *